US007469953B2

(12) United States Patent
Heath et al.

(10) Patent No.: US 7,469,953 B2
(45) Date of Patent: Dec. 30, 2008

(54) GOOSENECK HINGE ASSEMBLY FOR VEHICLE

(75) Inventors: Jeffrey D. Heath, Orion, MI (US); David T. Renke, Macomb, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 67 days.

(21) Appl. No.: 11/459,369

(22) Filed: Jul. 24, 2006

(65) Prior Publication Data

US 2008/0018131 A1 Jan. 24, 2008

(51) Int. Cl.
*B62D 25/10* (2006.01)

(52) U.S. Cl. ...................... 296/76; 296/146.11; 49/386; 16/289

(58) Field of Classification Search .................. 296/76, 296/146.11; 49/386; 16/278, 279, 289, 308
See application file for complete search history.

(56) References Cited

U.S. PATENT DOCUMENTS

| | | | | |
|---|---|---|---|---|
| 2,871,505 | A * | 2/1959 | Clark et al. | 16/308 |
| 2,894,277 | A * | 7/1959 | Bogater et al. | 16/298 |
| 2,986,770 | A * | 6/1961 | Hammond | 16/308 |
| 3,085,286 | A * | 4/1963 | Whitehouse et al. | 16/308 |
| 3,476,375 | A * | 11/1969 | Brasseur | 267/277 |
| 4,580,315 | A * | 4/1986 | Beckwith | 16/308 |
| 4,776,626 | A * | 10/1988 | Seyler | 296/76 |
| 5,465,862 | A * | 11/1995 | Devlin | 220/830 |
| 5,584,099 | A * | 12/1996 | Westerdale | 16/245 |
| 5,664,289 | A * | 9/1997 | Wolda et al. | 16/298 |
| 5,873,619 | A * | 2/1999 | Lewkoski et al. | 296/76 |
| 5,967,586 | A * | 10/1999 | Duffy et al. | 296/76 |
| 6,382,704 | B1 * | 5/2002 | Nastasoiu | 296/146.11 |
| 2006/0230578 | A1 * | 10/2006 | Renke et al. | 16/289 |

FOREIGN PATENT DOCUMENTS

| | | | |
|---|---|---|---|
| DE | 3343621 | A1 | 6/1985 |

* cited by examiner

*Primary Examiner*—Lori L Lyjak

(57) ABSTRACT

A gooseneck hinge assembly for a closure of a vehicle includes a body side bracket adapted to be connected to a vehicle body of the vehicle and a closure side bracket having a gooseneck shape adapted to be connected to a closure for closing an aperture in the vehicle body. The gooseneck hinge assembly also includes a pivot pin to pivotally connect the closure side bracket to the body side bracket to allow rotational movement therebetween. The gooseneck hinge assembly further includes a torque rod adapted to be connected to another one of the closure side bracket, and a torque rod assembly connected to the body side bracket and the torque rod and being infinitely adjustable to counterbalance a weight of the closure when opening and closing the aperture.

16 Claims, 3 Drawing Sheets

GOOSENECK HINGE ASSEMBLY FOR VEHICLE

TECHNICAL FIELD

The present invention relates generally to hinges for vehicles and, more particularly, to a gooseneck hinge assembly for a vehicle.

BACKGROUND OF THE INVENTION

It is known to provide a closure such as a decklid for a vehicle to open and close a rear compartment or trunk of a vehicle body of the vehicle. Typically, the deck lid is attached to the vehicle body with at least one, preferably a pair of laterally spaced hinges. Currently, the decklid hinges are of a goose-neck type for allowing motion of the decklid from a fully open position to a fully closed position and for counterbalancing a weight of the decklid. Typically, these gooseneck hinges require the use of torsion bars that require installation at a vehicle assembly plant. The assemblers must preload the torsion bars before final assembly to the overall vehicle. However, the torsion bar outputs can be adjusted to only a few discrete settings by a technician.

Therefore, it is desirable to provide a gooseneck hinge for a closure of a vehicle that provides fine variable or infinite adjustment of the torque output thereof. It is also desirable to provide a gooseneck hinge that allows an operator to change from a free-rise to a pop and hang position for the closure. Therefore, there is a need in the art to provide a gooseneck hinge for a vehicle that meets these desires.

SUMMARY OF THE INVENTION

Accordingly, the present invention is a gooseneck hinge assembly for a closure of a vehicle including a body side bracket adapted to be connected to a vehicle body of the vehicle and a closure side bracket having a gooseneck shape adapted to be connected to a decklid for closing an aperture in the vehicle body. The gooseneck hinge assembly also includes a pivot pin to pivotally connect the closure side bracket to the body side bracket to allow rotational movement therebetween. The gooseneck hinge assembly further includes a torque rod adapted to be connected to another one of the closure side bracket, and a torque rod assembly connected to the body side bracket and the torque rod and being infinitely adjustable to counterbalance a weight of the closure when opening and closing the aperture.

One advantage of the present invention is that a new gooseneck hinge assembly is provided for a closure such as a decklid or liftgate of a vehicle. Another advantage of the present invention is that the gooseneck hinge assembly has an adjustable link that provides fine variable or infinite tuning of a torque rod. Yet another advantage of the present invention is that the gooseneck hinge assembly has an adjustable link torsion bar spring that can be pre-set from a supplier and allows for building vehicles at an assembly plant with a pre-set torque output from a supplier. Still another advantage of the present invention is that the gooseneck hinge assembly allows users to choose between a free-rise or auto-rise performance and a pop and hang performance for vehicle closures such as decklids or liftgates on a vehicle. A further advantage of the present invention is that the gooseneck hinge assembly has improved quality as the assembly plant operators can finely tune torque output of the hinge assemblies. Yet a further advantage of the present invention is that the gooseneck hinge assembly allows for additional content on the closure such as a spoiler.

Other features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
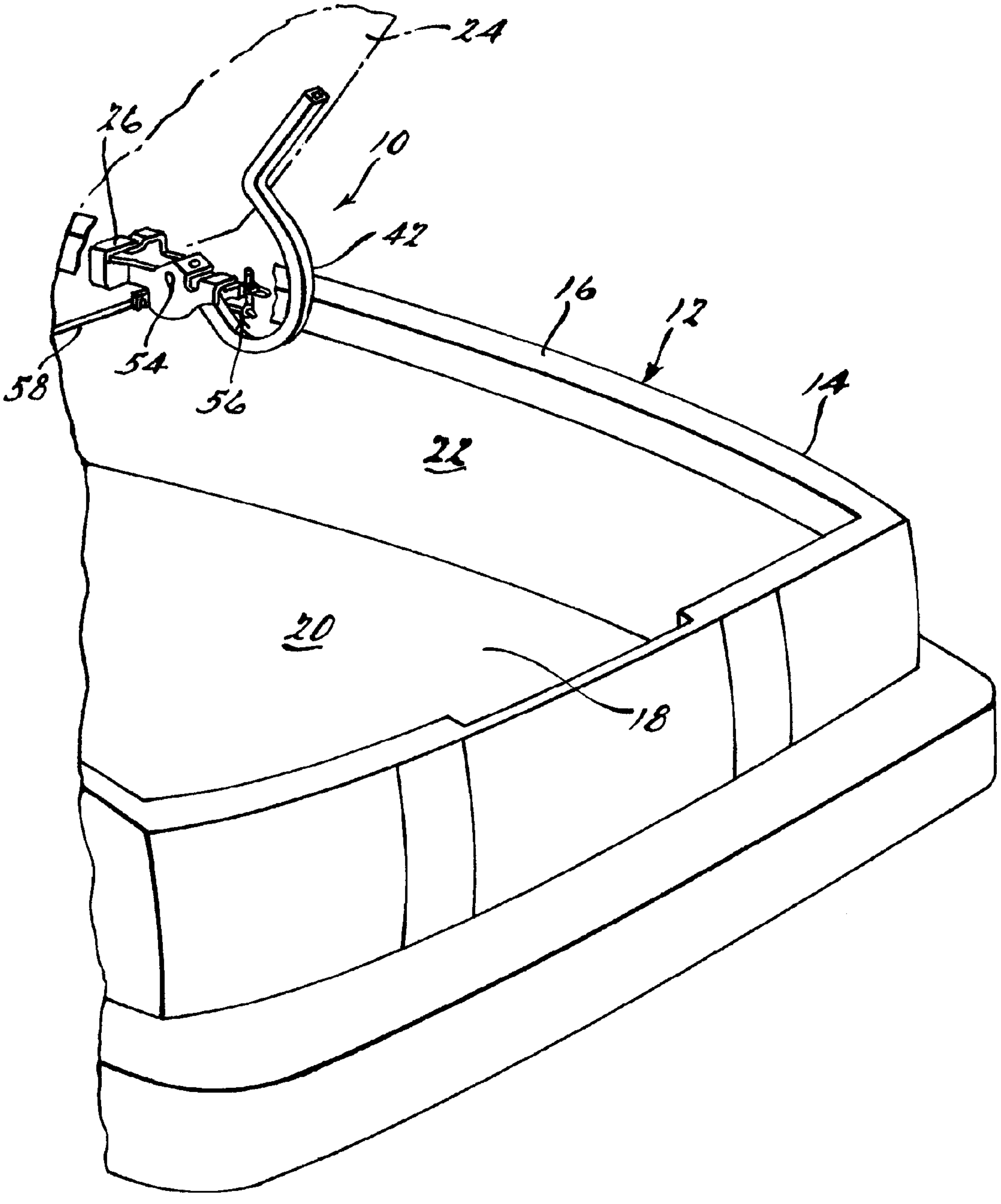
FIG. 1 is a gooseneck hinge assembly, according to the present invention, illustrated in operational relationship with a vehicle.

Referring to the drawings and in particular FIG. 1, one embodiment of a gooseneck hinge assembly 10, according to the present invention, is shown for a vehicle such as an automotive vehicle, generally indicated at 12. Such vehicles 12 typically include a vehicle body 14 (partially shown) forming a trunk or rear compartment 16. The rear compartment 16 has an opening such as a recess 18 therein. The recess 18 is formed by a floorpan 20 and side walls 22 extending upwardly from the floorpan 20 and generally perpendicular thereto. The vehicle body 14 also includes a closure such as a decklid 24 closing the recess 18. The decklid 24 is attached to the rear compartment 16 of the vehicle body 14 by at least one, preferably a pair of laterally spaced gooseneck hinge assemblies 10. It should be appreciated that only one gooseneck hinge assembly 10 is illustrated in FIG. 1 and will be subsequently described. It should also be appreciated that, except for the gooseneck hinge assembly 10, the vehicle 12 is conventional and known in the art.

Figure 3:
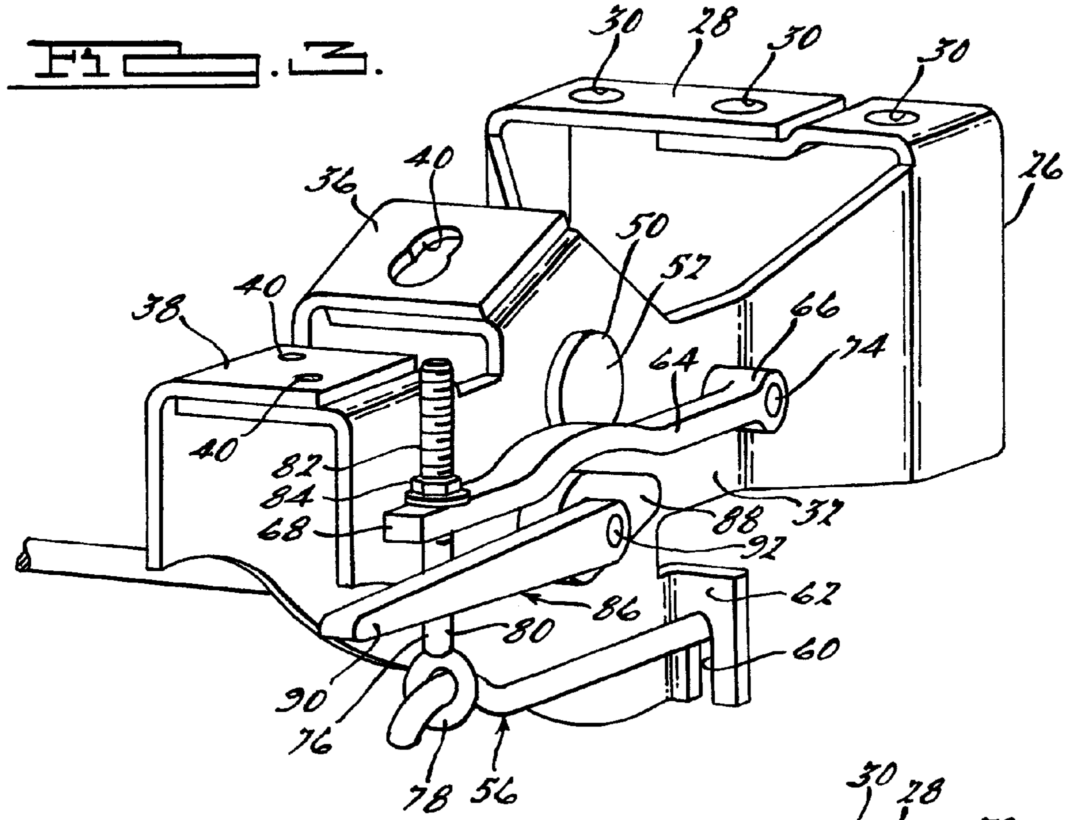
FIG. 3 is a perspective view of a portion of the gooseneck hinge assembly of FIG. 1.
Figure 2:
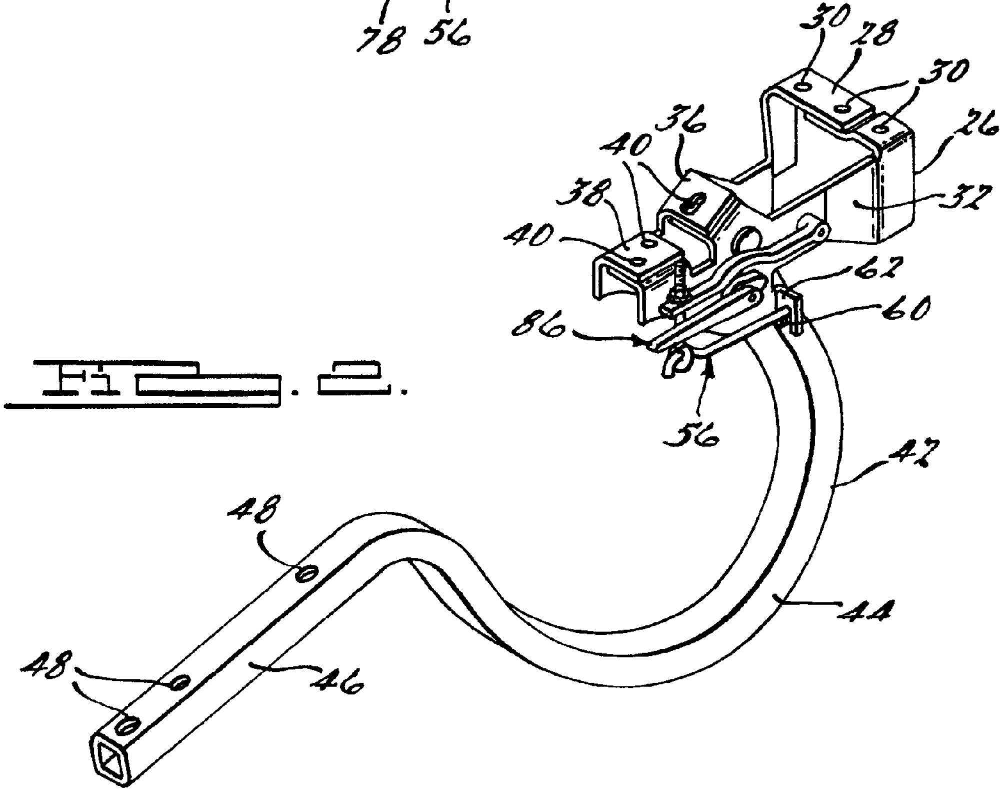
FIG. 2 is a perspective view of the gooseneck hinge assembly of FIG. 1.

Referring to FIGS. 2 and 3, the gooseneck hinge assembly 10 includes a body side bracket or strap 26 to be mounted to the vehicle body 14. The body side bracket 26 is generally rectangular in shape. The body side bracket 26 has a base portion 28 with a generally inverted "U" shape. The base portion 28 has at least one, preferably a plurality of apertures 30 extending therethrough for a function to be described. The body side bracket 26 also has a pair of opposed side portions 32 extending longitudinally from the base portion 28. Each of the side portions 32 has at least one aperture (not shown) extending therethrough for a function to be described. The body side bracket 26 also has a first support portion 36 extending laterally between the side portions 32 and a second support portion 38 spaced longitudinally from the first support portion 36 and extending laterally between the side portions 32. The first support portion 36 and second support portion 38 have a generally inverted "U" shape. Each of the first support portion 36 and second support portion 38 have at least one, preferably a plurality of apertures 40 extending therethrough for a function to be described.

The gooseneck hinge assembly 10 also includes at least one, preferably a plurality of fasteners (not shown) such as bolts to attach the body side bracket 26 to the vehicle body 14. Each of the fasteners extends through some of the apertures 30 and 40 in the body side bracket 26 and corresponding apertures (not shown) in the vehicle body 14 and is engaged by nuts (not shown) to prevent the fasteners from disengaging the apertures 30 and 40. The body side bracket 26 is made of a rigid material such as metal. The body side bracket 26 may be formed in one or more pieces joined together by a suitable mechanism such as welding. The body side bracket 26 is integral and one-piece. It should be appreciated that the fasteners are conventional and known in the art.

The gooseneck hinge assembly 10 also includes a closure side bracket or strap 42 to allow the decklid 24 to be attached to the body side bracket 26. The closure side bracket 42 has a generally "gooseneck" shape. The closure side bracket 42 is a hollow member having a generally rectangular cross-sectional shape. The closure side bracket 42 has a generally arcuate base portion 44 and an attachment portion 46 extending longitudinally from one end of the base portion 44. The base portion 44 has at least one, preferably a plurality of apertures (not shown) extending therethrough near one end thereof for a function to be described. The base portion 44 also has a pair of opposed slots (not shown) extending therein from one end thereof on sides adjacent the apertures. The attachment portion 46 includes at least one, preferably a plurality of apertures 48 extending therethrough for a function to be described.

The gooseneck hinge assembly 10 includes at least one, preferably a plurality of fasteners (not shown) such as bolts to attach the closure side bracket 42 to the decklid 24. Each of the fasteners extends through some of the apertures 48 in the attachment portion 46 and corresponding apertures (not shown) in the decklid 24 and is engaged by nuts (not shown) to prevent the fasteners from disengaging the apertures. The closure side bracket 42 is made of a rigid material such as metal. The closure side bracket 42 is integral and one-piece. It should be appreciated that the fasteners are conventional and known in the art.

The gooseneck hinge assembly 10 also includes at least one first or pivot pin 50 to pivotally attach the closure side bracket 42 to the body side bracket 26 at a forward end thereof. The pivot pin 50 includes a head portion 52 extending radially, a shaft portion (not shown) extending generally axially from the head portion 52, and a flange portion 54 (FIG. 1) extending radially outwardly near one end thereof. The shaft portion extends through a pair of opposed apertures of the body side bracket 26 and closure side bracket 42, respectively such that the head portion 56 is disposed on one side of the body side bracket 26 and the flange portion 54 is disposed on the other side of the body side bracket 26. The pivot pin 50 is made of a rigid material such as metal.

The gooseneck hinge assembly 10 further includes an adjustable torque assembly, according to the present invention and generally indicated at 56, to power the decklid 24 to an open position by applying a force to the closure side bracket 42. The adjustable torque assembly 56 includes a torque bar or rod 58. The torque rod 58 has one end connected to the closure side bracket 42 of one of the pair of laterally spaced gooseneck hinge assemblies 10 and the other end of the torque rod 58 is disposed through an elongated slot 60 of a laterally extending flange 62 in the body side bracket 26 for connection to the adjustable torque assembly 56. It should be appreciated that the adjustable torque assembly 58 applies a force to counterbalance the weight of the decklid 24.

The adjustable torque assembly 56 also includes an arm 64 pivotally connected to the body side bracket 26. The arm 64 is generally rectangular in shape and extends longitudinally between a first end 66 and a second end 68. The arm 64 may be shaped to form a depression or recess 70 between the ends 66 and 68 thereof for a function to be described. The arm 64 has a first aperture 72 extending laterally through the first end 66. The arm 64 has a second aperture (not shown) extending vertically through the second end 68. The arm 64 is made of a rigid material such as metal.

The adjustable torque assembly 56 further includes a pin 74 to pivotally connect the arm 64 to the body side bracket 26. The pin 74 is generally cylindrical in shape with a generally circular cross-sectional shape. The pin 74 extends through the first aperture 72 in the first end 66 and a corresponding aperture (not shown) in the body side bracket 26. It should be appreciated that the arm 64 pivots or rotates about the pin 74 relative to the body side bracket 26.

The adjustable torque assembly 56 further includes an adjustment link 76 to adjust a torque output of the hinge assembly 10. The adjustment link 76 has a head portion 78 extending radially and a shaft portion 80 extending axially from the head portion 78. The head portion 78 is generally formed as ring. The shaft portion 80 is generally cylindrical in shape and has a generally circular cross-sectional shape. The shaft portion 80 has a threaded portion 82 at one end. The shaft portion 80 extends through the second aperture with the threaded portion 82 being disposed above the second end 68 and the head portion 78 being disposed below the second end 68.

The adjustable torque assembly 56 also includes an adjustable member 84 to adjust the position of the adjustment link 76 relative to the arm 64. The adjustable member 84 is in the form of a nut. The adjustable member 84 has a threaded aperture (not shown) extending axially therethrough. The adjustable member 84 is disposed about the shaft portion 80 of the adjustment link 76 and threadably engages the threaded portion 82 of the shaft portion 80 of the adjustment link 76. It should be appreciated that the adjustable member 84 is rotated relative to the adjustment link 76 to move the adjustment link 76 axially to adjust a torque output of the torque rod 58. It should also be appreciated that the adjustable member 84 and adjustment link 76 provide infinite tuning of the torque rod 58.

The gooseneck hinge assembly 10 includes an optional cam lever, generally indicated at 86, to allow the decklid 24 to either free-rise or pop and hang. The cam lever 86 extends longitudinally between a first end 88 and a second end 90. The first end 88 is shaped to form a cam having an "egg" shape for a function to be described. The cam lever 86 has an aperture 92 extending laterally through the first end 88. The second end 90 is shaped or tapered to form a handle to allow a user to grasp and rotate the cam lever 86. The cam lever 86 is made of a rigid material such as metal. It should be appreciated that the first end 88 cooperates with the recess 70 in the arm 64.

The gooseneck hinge assembly 10 further includes a pin 94 to pivotally connect the cam lever 86 to the body support bracket 26. The pin 94 is generally cylindrical in shape with a generally circular cross-sectional shape. The pin 94 extends through the aperture 92 in the first end 88 and a corresponding aperture (not shown) in the body side bracket 26. It should be appreciated that the cam lever 86 pivots or rotates about the pin 94 relative to the body side bracket 26.

In operation, the torque rod assembly 56 may be adjusted to adjust a force on the closure side bracket 42. The torque rod 58 extends through the head portion 78 of the adjustment link 76. The adjustment member 84 is rotated to move the end of the torque rod 58 either closer to the arm 64 to increase the torque of the torque rod 58 or away from the arm 64 to decrease the torque of the torque rod 58. It should be appreciated that the torque rod 58 may be fine variable or infinitely adjusted.

Figure 4:
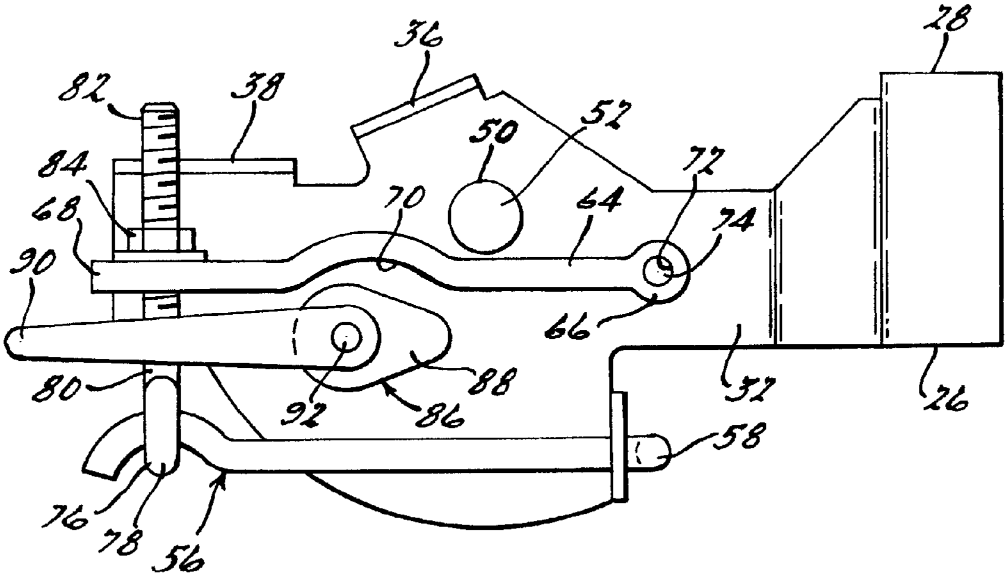
FIG. 4 is an elevational view of a portion of the gooseneck hinge assembly of FIG. 1 illustrated in a first operating position.
Figure 5:
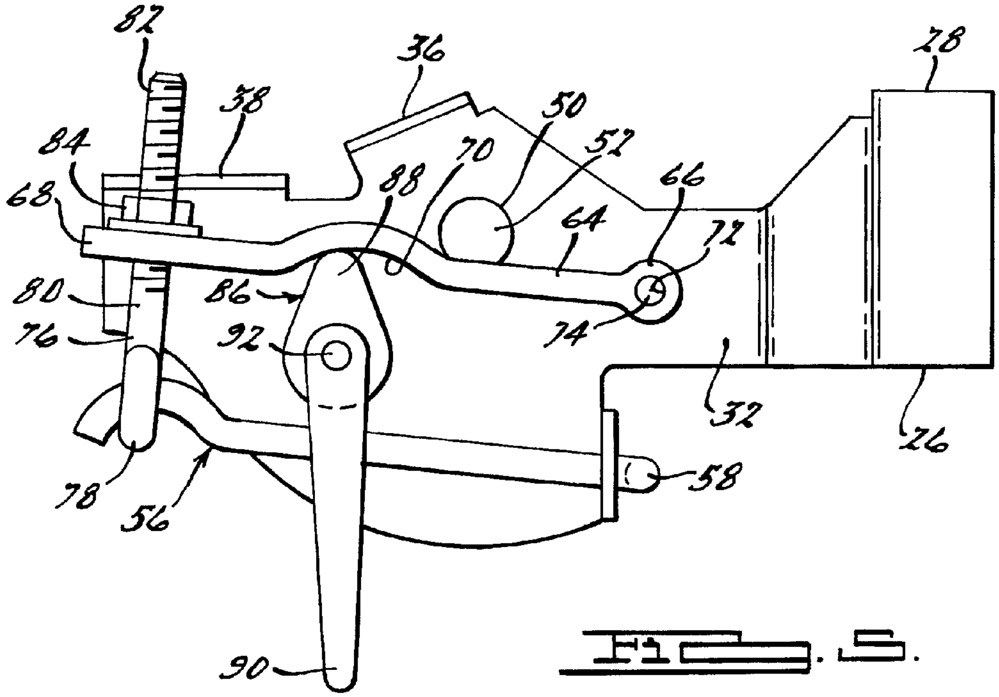
FIG. 5 is an elevational view of the gooseneck hinge assembly of FIG. 1 illustrated in a second operating position.

Referring to FIGS. 4 and 5, the gooseneck hinge assembly 10 is shown in a first or pop-and-hang operating position and a second or free-rise operating position, respectively. With the gooseneck hinge assembly 10, to open the decklid 24, the user unlatches the decklid 24 and the torque rod 58 applies a force to the closure side bracket 42 to open the decklid 24 to the open position.

To free-rise the decklid 24, the user grasps the second end 90 of the cam lever 68 and rotates the second end 90, which in turn, rotates the first end 88 to dispose the first end 88 in the recess 80 of the arm 64 as illustrated in FIG. 5. When the decklid 24 is to be closed or allowed to pop-and-hang to the open position, the second end 90 of the cam lever 86 is rotated in the opposite direction such that the first end 88 is not disposed in the recess 70 of the arm 64 as illustrated in FIG. 4. It should be appreciated that the gooseneck hinge assembly 10 allows the decklid 24 to be rotated open and closed. It should also be appreciated that, if desired, an automatically opening closure could be obtained by providing enough spring force and/or moment arm.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A gooseneck hinge assembly for a closure of a vehicle comprising:

a body side bracket adapted to be connected to a vehicle body of the vehicle;

a closure side bracket having a gooseneck shape adapted to be connected to a closure for closing an aperture in the vehicle body;

a pivot pin to pivotally connect said closure side bracket to said body side bracket to allow rotational movement therebetween;

a torque rod adapted to be connected to another one of said closure side bracket; and a torque rod assembly connected to said body side bracket and said torque rod and being infinitely adjustable to counterbalance a weight of the closure when opening and closing the aperture, wherein said torque rod assembly includes an adjustment link connected to said torque rod and to an arm pivotally connected to said body side bracket.

2. A gooseneck hinge assembly as set forth in claim 1 wherein said torque rod assembly includes an adjustment member cooperating with said adjustment link to move said torque rod closer and farther away from said arm.

3. A gooseneck hinge assembly as set forth in claim 1 wherein said adjustment link comprises a head portion to receive a portion of said torque rod and a shaft portion extending through said arm, said shaft portion having a threaded portion thereon.

4. A gooseneck hinge assembly as set forth in claim 1 including a cam lever pivotally connected to said body side bracket.

5. A gooseneck hinge assembly for a closure of a vehicle comprising:

a body side bracket adapted to be connected to a vehicle body of the vehicle;

a closure side bracket having a gooseneck shape adapted to be connected to a closure for closing an aperture in the vehicle body;

a pivot pin to pivotally connect said closure side bracket to said body side bracket to allow rotational movement therebetween;

a torque rod adapted to be connected to another one of said closure side bracket;

a torque rod assembly connected to said body side bracket and said torque rod and being infinitely adjustable to counterbalance a weight of the closure when opening and closing the aperture;

said torque rod assembly including an adjustment link connected to said torque rod and an arm connected to said body side bracket;

a cam lever pivotally connected to said body side bracket; and wherein said cam lever has a first end cooperating with said arm and a second end adapted to be grasped by a user to rotate said first end.

6. A gooseneck hinge assembly as set forth in claim 5 wherein said arm has a recess and said first end of said cam lever engages and disengages said recess of said arm.

7. A gooseneck hinge assembly as set forth in claim 5 including a pin to pivotally connect said first end to said body side bracket.

8. A gooseneck hinge assembly as set forth in claim 3 wherein said adjustment link further comprises a nut disposed about said threaded portion of said shaft.

9. A gooseneck hinge assembly for a closure of a vehicle comprising:

a body side bracket adapted to be connected to a vehicle body of the vehicle;

a closure side bracket having a gooseneck shape adapted to be connected to a closure for closing an aperture in the vehicle body;

a pivot pin to pivotally connect said closure side bracket to said body side bracket to allow rotational movement therebetween;

a torque rod adapted to be connected to another one of said closure side bracket;

a torque rod assembly connected to said body side bracket and said torque rod and being infinitely adjustable to counterbalance a weight of the closure when opening and closing the aperture;

said torque rod assembly including an adjustment link connected to said torque rod and an arm connected to said body side bracket; and a pin to pivotally connect one end of said arm to said body side bracket.

10. A closure assembly for a vehicle comprising: a closure; and a gooseneck hinge assembly comprising a body side bracket adapted to be connected to a vehicle body of the vehicle, a closure side bracket having a gooseneck shape connected to said closure, a pivot pin to pivotally connect said closure side bracket to said body side bracket to allow rotational movement therebetween, a torque rod adapted to be connected to another one of said closure side bracket, and a torque rod assembly connected to said body side bracket and said torque rod and being infinitely adjustable to counterbalance a weight of said closure when opening and closing the aperture, wherein said torque rod assembly includes an adjustment link connected to said torque rod and to an arm pivotally connected to said body side bracket.

11. A closure assembly as set forth in claim 10 wherein said torque rod assembly includes an adjustment member cooperating with said adjustment link to move said torque rod closer and farther away from said arm.

12. A closure assembly as set forth in claim 10 wherein said adjustment link comprises a head portion to receive a portion of said torque rod and a shaft portion extending through said arm, said shaft portion having a threaded portion thereon.

13. A closure assembly as set forth in claim 10 including a cam lever pivotally connected to said body side bracket.

14. A closure assembly for a vehicle comprising:

a closure;

a gooseneck hinge assembly comprising a body side bracket adapted to be connected to a vehicle body of the vehicle, a closure side bracket having a gooseneck shape connected to said closure, a pivot pin to pivotally connect said closure side bracket to said body side bracket to allow rotational movement therebetween, a torque rod adapted to be connected to another one of said closure side bracket, and a torque rod assembly connected to said body side bracket and said torque rod and being infinitely adjustable to counterbalance a weight of said closure when opening and closing the aperture;

said torque rod assembly including an adjustment link connected to said torque rod and an arm connected to said body side bracket;

a cam lever pivotally connected to said body side bracket; and wherein said cam lever has a first end cooperating with said arm and a second end adapted to be grasped by a user to rotate said first end.

15. A closure assembly as set forth in claim 14 wherein said arm has a recess and said first end of said cam lever engages and disengages said recess of said arm.

16. A vehicle comprising:

a vehicle body having an aperture therein;

a closure for closing said aperture; and a gooseneck hinge assembly connected to said closure and said vehicle body comprising a body side bracket connected to said vehicle body, a closure side bracket having a gooseneck shape connected to said closure, a pivot pin to pivotally connect said closure side bracket to said body side bracket to allow rotational movement therebetween, a torque rod adapted to be connected to another one of said closure side bracket, and a torque rod assembly connected to said body side bracket and said torque rod and being infinitely adjustable to counterbalance a weight of said closure when opening and closing the aperture, wherein said torque rod assembly includes an adjustment link connected to said torque rod and to an arm pivotally connected to said body side bracket.

* * * * *